B. F. GOLLMAR.
VAPOR STOVE.
APPLICATION FILED APR. 17, 1916.
1,220,412.
Patented Mar. 27, 1917.
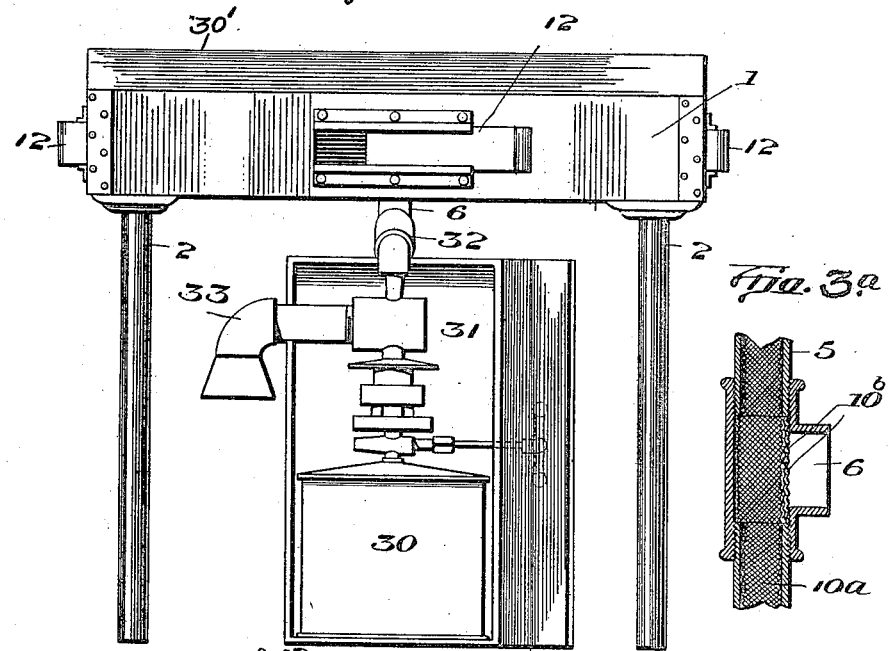
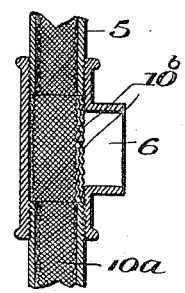
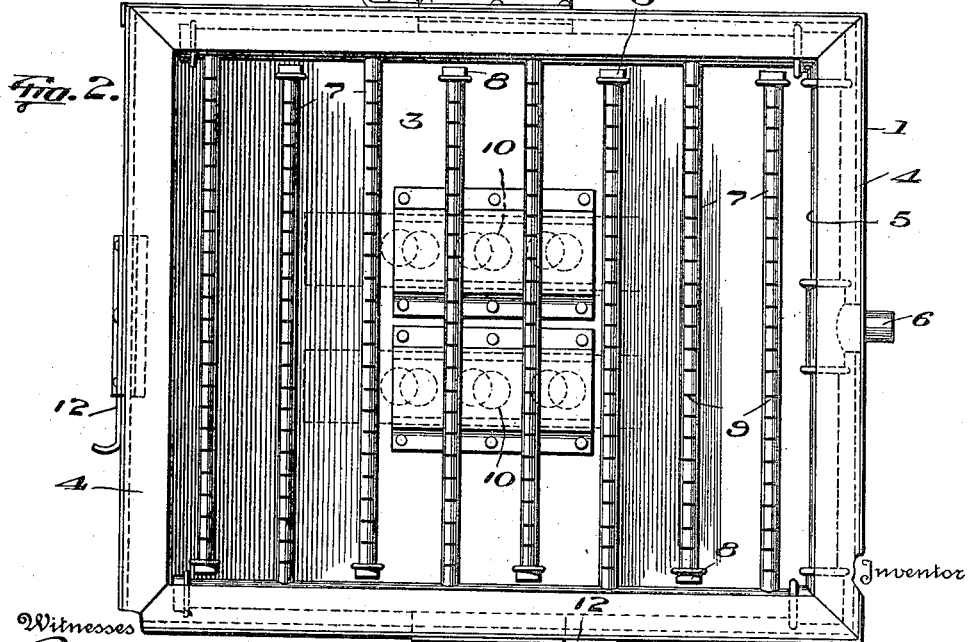
Witnesses
Philip E. Barnes
E. J. Sheeby
Inventor
B. F. Gollmar
James J. Sheeby & Co.,
Attorneys ously understand, and at the same time assuring an adequate supply of vapor to each slot 9 of the tube so that the vapor will be burnt at each slot in the form of a fish-tail flame. The wire-mesh or reticulated material of the burner tube linings is preferably of 40 to 100 mesh and when it is employed the vapor or gas is rapidly circulated throughout the length of the tubes and as much vapor or gas is supplied to the slots 9 remote from the source of supply as to the slots 9 adjacent to said source. Said wire-mesh linings also serve to assure the supply of an adequate amount of air to the burner slots 9 while precluding drafts of air from interfering with combustion of the vapor at said points. The caps 8 of the tubes 7 are removable in order that the wire-mesh linings may be placed in and removed from the burners as occasion demands.

UNITED STATES PATENT OFFICE.

BENJAMIN F. GOLLMAR, OF BARABOO, WISCONSIN.

VAPOR-STOVE.

1,220,412.   Specification of Letters Patent.   Patented Mar. 27, 1917.

Application filed April 17, 1916. Serial No. 91,778.

*To all whom it may concern:*

Be it known that I, BENJAMIN F. GOLLMAR, a citizen of the United States, residing at Baraboo, in the county of Sauk and State of Wisconsin, have invented new and useful Improvements in Vapor-Stoves, of which the following is a specification.

My present invention pertains to vapor stoves and its novelty will be fully understood from the following description and claim when the same are read in connection with the drawings accompanying, in which:

Figure 1 is a front elevation showing the body of the stove and the means for supplying vapor to the burners in said body, and also showing the frying pan on the body.

Fig. 2 is a plan of the same, with the frying pan removed.

Fig. 3 is an enlarged detail section of a portion of one burner tube.

Fig. 3ª is a detail section of the portion of the manifold adjacent to the vapor supply conduit.

Similar numerals of reference designate corresponding parts in all of the views of the drawings.

My improved stove is preferably portable in character, and comprises a shallow body 1 open at its upper side, and legs 2, preferably of gas pipe, arranged under and supporting the body.

In the body 1 is a burner space 3 which occupies practically all of the interior of the body, and is preferably surrounded by a channel-iron or other frame 4, and in said burner space is disposed a horizontal manifold 5, of general U-shape in plan, designed to be supplied with vapor or gas through a conduit 6, as hereinafter described. Arranged between the arms of the manifold 5 are burner tubes 7, some of which are connected to and receive vapor from one manifold arm while the alternate tubes are connected to and receive vapor from the other manifold arm. The said burner tubes are arranged in parallel and spaced relation, and each is provided at its end remote from its complementary manifold arm with a removable cap 8. Each of the burner tubes is also provided at intervals in its length with transverse slots 9 for the emission of the vapor or gas which is burnt at said points. In each of the burner tubes 7 is arranged a tubular lining 10 of wire mesh or other suitable reticulated material designed to serve the important purpose of preventing back firing and at the same time assuring an adequate supply of vapor to each slot 9 of the tube so that the vapor will be burnt at each slot in the form of a fish-tail flame. The wire-mesh or reticulated material of the burner tube linings is preferably of 40 to 100 mesh and when it is employed the vapor or gas is rapidly circulated throughout the length of the tubes and as much vapor or gas is supplied to the slots 9 remote from the source of supply as to the slots 9 adjacent to said source. Said wire-mesh linings also serve to assure the supply of an adequate amount of air to the burner slots 9 while precluding drafts of air from interfering with combustion of the vapor at said points. The caps 8 of the tubes 7 are removable in order that the wire-mesh linings may be placed in and removed from the burners as occasion demands.

For supporting combustion in the burner space 3, the body 1 is provided in its bottom wall with one or a plurality of groups of apertures 10, and slidable, apertured dampers (see dotted lines in Fig. 2) for controlling—*i. e.*, regulating the size of apertures 10, as occasion demands. It will also be observed that the burner space 3 is provided in its side walls with ventilators 12.

At 30 and 31 are a gasolene tank and vapor or gas generator, respectively. The generator may be arranged on the ground at one end of the stove or under the body thereof, and the generator is connected through a flexible tube 32 with the conduit 6 of the U-shaped manifold hereinafter referred to. The generator 31 is provided with an air induction element 33 and is otherwise of the ordinary or any other type compatible with the operation of my novel stove; it being understood that the generator *per se* forms no part of my present invention. I prefer, however, in practice to have the generator 31 detachable from the supply conduit of the manifold so as to increase the portability of the apparatus as a whole and adapt the same to be set up ready for successful operation in a few minutes.

As shown in Fig. 1, a frying pan unit 30′ is removably arranged on the body 1.

It is further to be understood that a wire-mesh lining 10ª is provided in the manifold 5 throughout the length thereof, Fig. 3ª, and that a plurality of layers of wire-mesh 10ᵇ are provided in the manifold 5 and opposite the induction orifice thereof, both provisions being made to assist in resisting back firing and to assure distribution of the combustible vapor to all of the outlets of the burner tubes.

Having described my invention, what I claim and desire to secure by Letters-Patent, is:

In a stove, a body having a burner space, a U-shaped horizontal manifold arranged in said space and adapted adjacent to its middle for connection with a source of vapor or gas supply, burner tubes connected to and extending inwardly from one arm of the manifold and having apertures at intervals in their lengths, alternate burner tubes connected to and extending inwardly from the other arm of the manifold and having apertures at intervals in their lengths, linings of reticulated material arranged in said tubes and close against the walls thereof, and layers of wire mesh arranged in the manifold opposite the connection for the source of vapor or gas supply.

In testimony whereof I have hereunto set my hand in presence of two subscribing witnesses.

BENJAMIN F. GOLLMAR.

Witnesses:
H. H. THOMAS,
EVAN A. EVANS.

Copies of this patent may be obtained for five cents each, by addressing the "Commissioner of Patents, Washington, D. C."